(12) United States Patent
Shodai et al.

(10) Patent No.: US 9,122,127 B2
(45) Date of Patent: Sep. 1, 2015

(54) LENS HOOD AND IMAGING APPARATUS

(71) Applicant: PANASONIC INTELLECTUAL PROPERTY MANAGEMENT CO., LTD., Osaka (JP)

(72) Inventors: Masayuki Shodai, Osaka (JP); Katsuya Kawakita, Osaka (JP); Koichi Muramatsu, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/527,503

(22) Filed: Oct. 29, 2014

(65) Prior Publication Data

US 2015/0131985 A1    May 14, 2015

(30) Foreign Application Priority Data

Nov. 8, 2013  (JP) .................................. 2013-231879
Jul. 14, 2014  (JP) .................................. 2014-143819

(51) Int. Cl.
*G03B 11/04* (2006.01)
(52) U.S. Cl.
CPC .................................... *G03B 11/045* (2013.01)

(58) Field of Classification Search
CPC ..... G03B 11/045; G03B 11/043; G02B 23/16
See application file for complete search history.

(56) References Cited

U.S. PATENT DOCUMENTS

| 8,475,063 | B1* | 7/2013 | Chang ........................... 396/448 |
| 2005/0117900 | A1 | 6/2005 | Ohmori et al. |
| 2013/0051784 | A1* | 2/2013 | Chang ........................... 396/448 |
| 2014/0049615 | A1* | 2/2014 | Uwagawa ....................... 348/47 |

FOREIGN PATENT DOCUMENTS

JP    2005-017523 A    1/2005

* cited by examiner

*Primary Examiner* — W B Perkey
(74) *Attorney, Agent, or Firm* — McDermott Will & Emery LLP

(57) ABSTRACT

A lens hood which is integrated with a lens cover is provided. The lens hood is attached in front of an imaging lens, and is configured to prevent undesired light incident on the imaging lens. The lens hood includes a lens cover having an upper door and a lower door, and a hood body. The hood body supports the upper door and the lower door so as to rotate the upper door and the lower door in opposite directions to each other about an axis orthogonal to an optical axis of the imaging lens, and has a storage space that stores the upper door and the lower door.

18 Claims, 12 Drawing Sheets

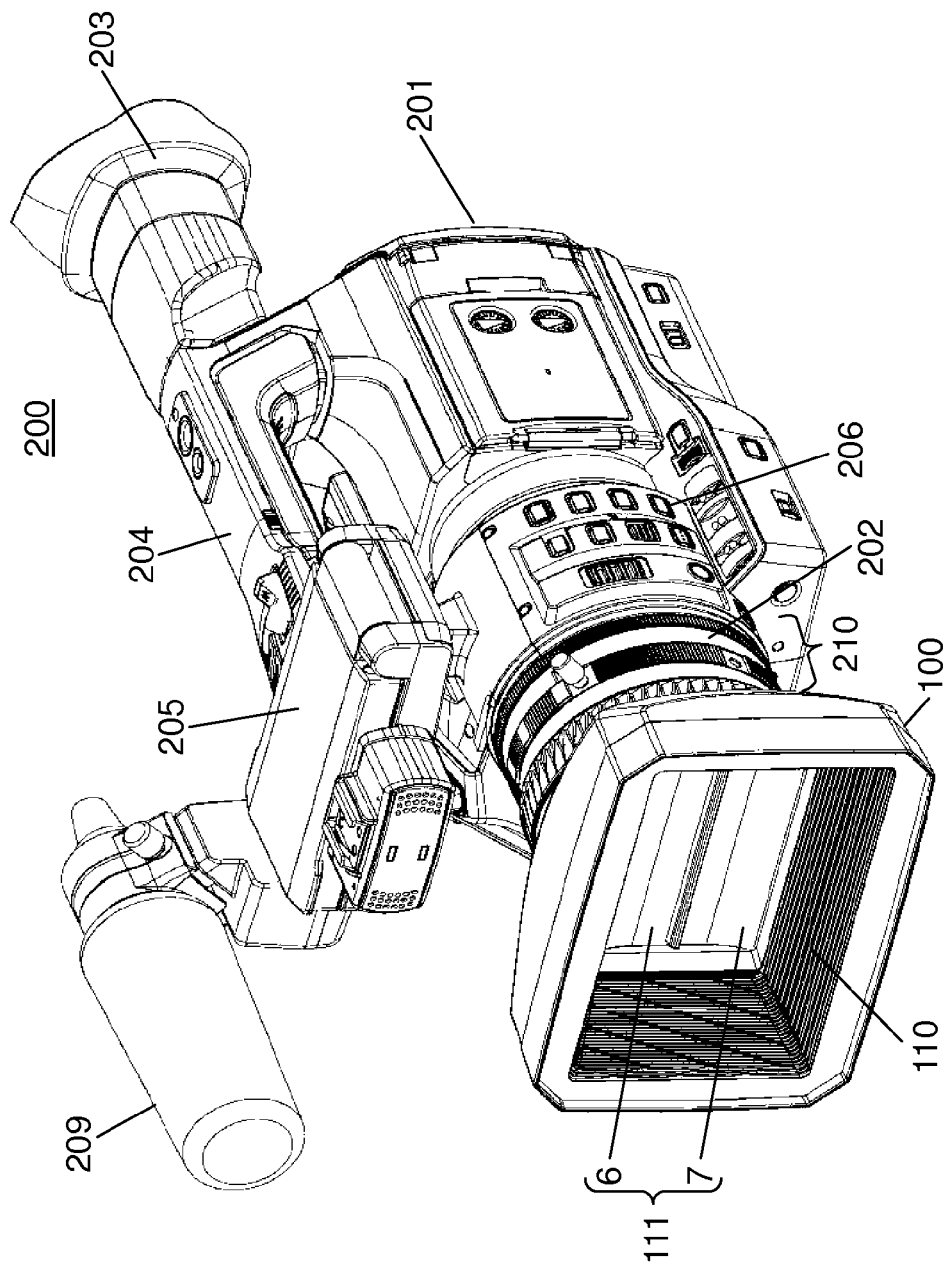

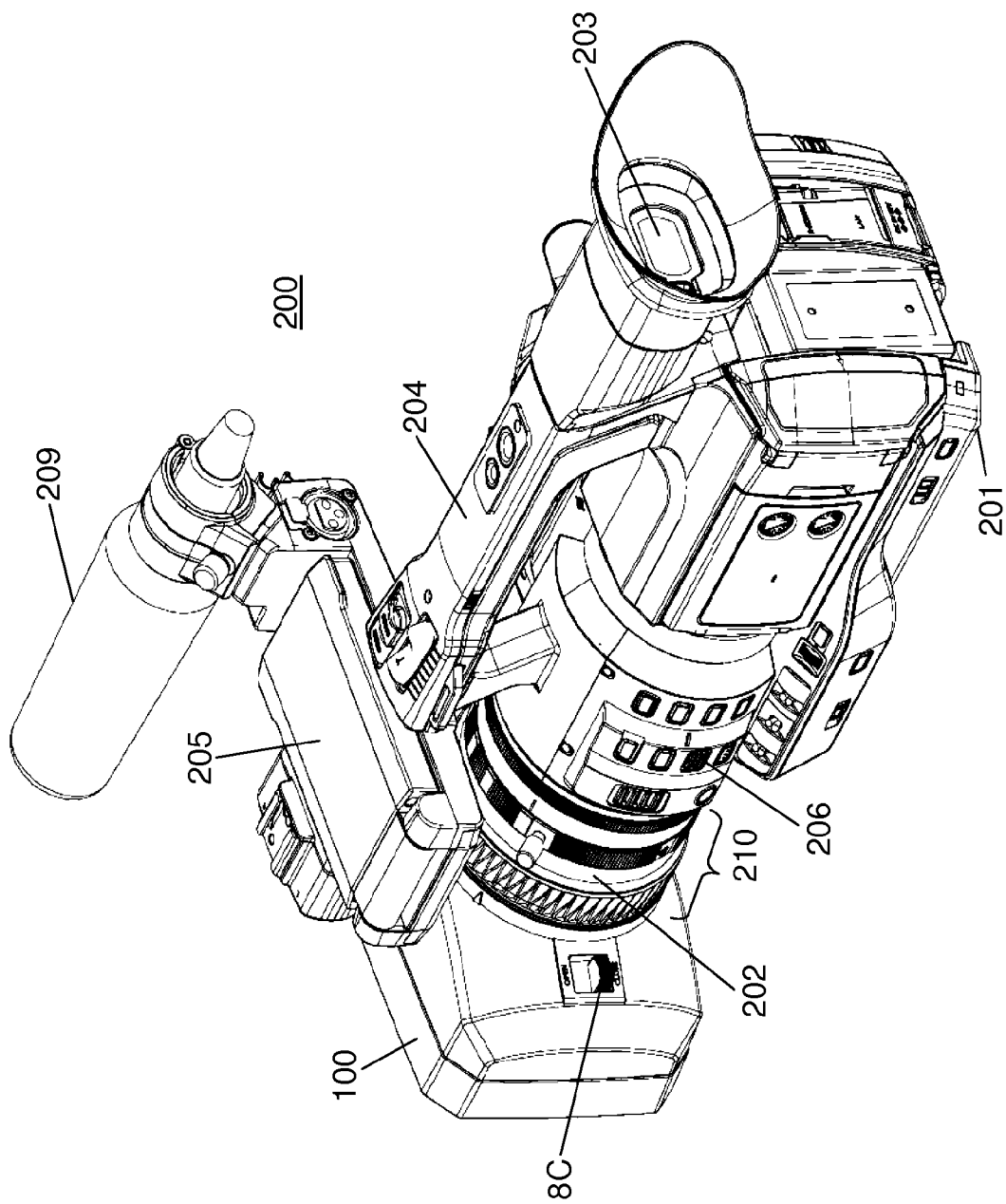

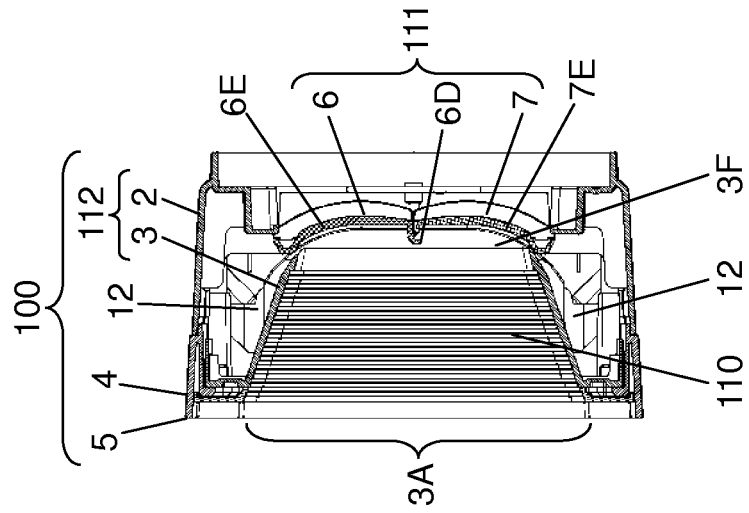
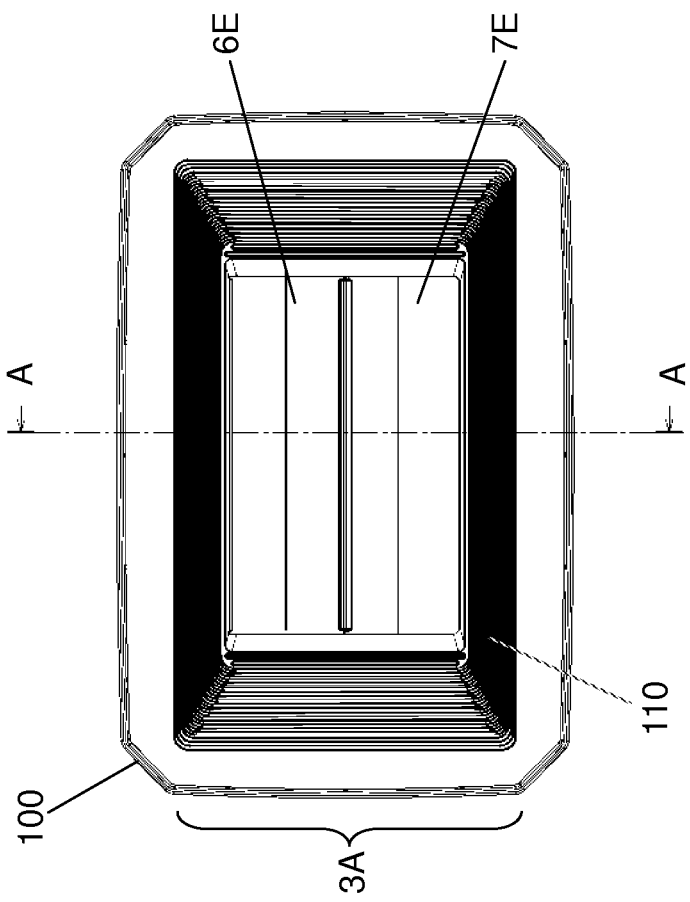

LENS HOOD AND IMAGING APPARATUS

RELATED APPLICATIONS

This application claims the benefit of Japanese Application No. 2013-231879, filed on Nov. 8, 2013 and Japanese Application No. 2014-143819, filed on Jul. 14, 2014, the disclosures of which Applications are incorporated by reference herein.

BACKGROUND OF THE INVENTION

1. Field of the Invention

The present disclosure relates to a lens hood attached in front of a lens to prevent undesired light incident on the lens, and an imaging apparatus to which the lens hood is attached.

2. Background Art

With a known structure, a lens hood and a lens cover (lens cap) are separate members that are to be attached to an imaging apparatus. However, such structure that the lens cover and the lens hood are separate members often leads to loss of the lens cover.

Unexamined Japanese Patent Publication No. 2005-17523 (Patent Document 1) discloses a lens hood with lens cover in which the lens cover is integrated into the lens hood. For the lens hood with lens cover, by sliding an operational protrusion of a lens cover open/close mechanism provided on a lens hood body, an upper door and a lower door that are stored in the lens hood body can be opened or closed.

SUMMARY OF THE INVENTION

The present disclosure provides a lens hood integrated with a lens cover, and an imaging apparatus to which the lens hood is attached.

A lens hood of the present disclosure is attached in front of an imaging lens, and is configured to prevent undesired light incident on the imaging lens. The lens hood includes a lens cover having an upper door and a lower door, and a hood body. The hood body supports an upper door and a lower door so as to rotate the upper door and the lower door in opposite directions to each other about an axis orthogonal to an optical axis of the imaging lens, and has a storage space that stores the upper door and the lower door.

An imaging apparatus of the present disclosure includes an imaging main body, an imaging lens attached to the imaging main body, a lens hood. The lens hood is attached in front of the imaging lens, and is configured to prevent undesired light incident on the imaging lens. The lens hood includes a lens cover having an upper door and a lower door, and a hood body. The hood body supports the upper door and the lower door so as to rotate the upper door and the lower door in opposite directions to each other about an axis orthogonal to an optical axis of the imaging lens, and has a storage space configured to store the upper door and the lower door.

The lens hood of present disclosure is effective for increasing the dustproof effect against sands and dusts.

BRIEF DESCRIPTION OF DRAWINGS

FIG. 1A is a perspective view of an imaging apparatus to which a lens hood is attached in a first exemplary embodiment when viewed from the forward upper left;

FIG. 1B is a perspective view of the imaging apparatus to which the lens hood is attached in the first exemplary embodiment when viewed from the rearward upper left;

FIG. 5A is a front view of the lens hood in the state where a lens cover is closed in the first exemplary embodiment;

FIG. 5B is a sectional view taken along an A-A line in FIG. 5A;

DETAILED DESCRIPTION OF THE INVENTION

Exemplary embodiment will be described below in detail with reference to figures. However, more detailed description than required may be omitted. For example, detailed description of well-known matters and overlapping description of the substantially same structures may be omitted. This prevents redundant description to facilitate understanding of those skilled in the art.

Appended figures and the following description serve to help those skilled in the art to fully understand the present disclosure, and are not intended to limit the subject matter recited in claims.

First Exemplary Embodiment

With reference to FIG. 1 to FIG. 10, a first exemplary embodiment will be described. In the first exemplary embodiment, a business-grade video camera is used as an example of imaging apparatus 200. However, imaging apparatus 200 of the present disclosure is not limited to the business-grade video camera, and may be any imaging apparatus to which lens hood 100 can be attached, such as freeze-frame imaging apparatuss and consumer video cameras.

[1-1. Configuration]

Figure 1C:
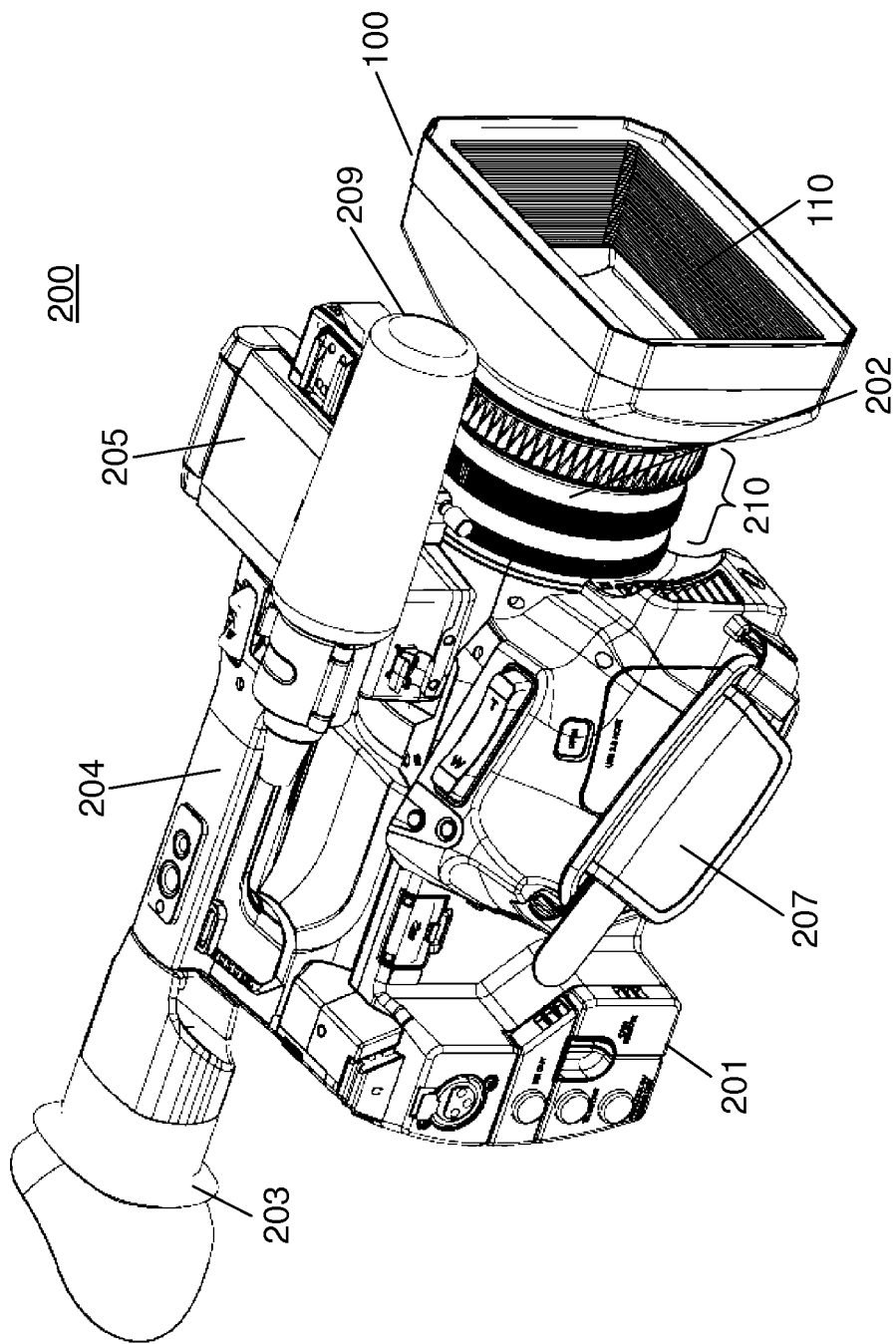
FIG. 1C is a perspective view of the imaging apparatus to which the lens hood is attached in the first exemplary embodiment when viewed from the forward upper right.

With reference to FIG. 1A to 1C, the configuration of imaging apparatus 200 will be generally described below.

FIG. 1A is a perspective view of imaging apparatus 200 to which lens hood 100 is attached in the first exemplary embodiment when viewed from the forward upper left. FIG. 1B is a perspective view of imaging apparatus 200 to which lens hood 100 is attached in the first exemplary embodiment when viewed from the rearward upper left. FIG. 1C is a perspective view of imaging apparatus 200 to which lens hood 100 is attached in the first exemplary embodiment when viewed from the forward upper right.

In this exemplary embodiment, in imaging apparatus 200 and each component attached to imaging apparatus 200, a side on which imaging lens 202 is disposed is defined as a front side, a side on which view finder 203 is disposed is defined as a rear side, a direction in which imaging apparatus 200 takes an image is defined as forward, and a direction in which video is displayed on view finder 203 is defined as rearward.

As shown in FIG. 1A to 1C, imaging apparatus 200 includes imaging main body 201 substantially shaped like a rectangular parallelepiped. Imaging main body 201 is provided with a camera unit for taking a video image of a subject, a display unit for displaying the taken video image, microphone 209 for recording a sound, a record/reproduction unit for recording/reproducing an image signal output from the camera unit and a sound signal output from microphone 209, and switch group 206 including operational buttons for various operations. These units are common component of the video camera and thus, description thereof with reference numerals is omitted.

Imaging main body 201 includes imaging lens 202 at its front face. Imaging lens 202 may be configured to be detachable from imaging main body 201, or may be configured to be integrated with imaging main body 201. Operational ring 210 is provided around imaging lens 202. Operational ring 210 is configured to be able to rotate in a rotational direction about an optical axis of imaging lens 202, and is used when the user adjusts focus, zoom, iris, and so on of a video image.

Lens hood 100 is detachably attached to a front face of imaging lens 202. Lens hood 100 includes lens cover 111 having upper door 6 and lower door 7. A surface of inner wall 110 of lens hood 100 takes a shape having a dustproof effect. Details of lens hood 100 will be described later.

View finder 203 for displaying a taken video image and a reproduced video image is provided rearward of imaging main body 201. The user can view the taken video image and the reproduced video image displayed on view finder 203 to visually check the video image.

Grip part 207 with a grip belt for the user to grip imaging apparatus 200 is provided on one side face (for example, a right side face of imaging main body 201 when viewed from the front) of imaging main body 201. Handle 204 serves as a handle for the user to use or carry imaging apparatus 200 is provided on a top of imaging main body 201. Display 205 for displaying a taken video image and a reproduced video image is openably attached in front of handle 204. Display 205 has a liquid crystal panel (not shown). When closed, the liquid crystal panel is stored in and hidden by a panel storage part (not shown) provided in front of handle 204, and when opened, the liquid crystal panel rises from the panel storage part and becomes exposed. The exposed liquid crystal panel can display the video image taken through imaging lens 202 and the reproduced video image of the video signal recorded in the record/reproduction unit thereon. A bottom face imaging main body 201 has a tripod seat (not shown) fixed to a tripod.

The user can take a moving image in the state where imaging main body 201 is fixed to the tripod, or can take a moving image with grip part 207 or handle 204 by hand. Thus, switch group 206 is disposed on an opposite side face of imaging main body 201 (for example, left side face of imaging main body 201 when viewed from the front) to the side face where grip part 207 is disposed, such that the user can operate imaging apparatus 200 with an opposite hand (for example, left hand) to a gripping hand (for example, right hand). Below-mentioned operational part 8C is preferably disposed such that the user can operate operational part 8C with a hand that operates switch group 206 (for example, left hand).

Next, with reference to FIG. 2A to FIG. 7, lens hood 100 in this exemplary embodiment will be described.

Figure 2A:
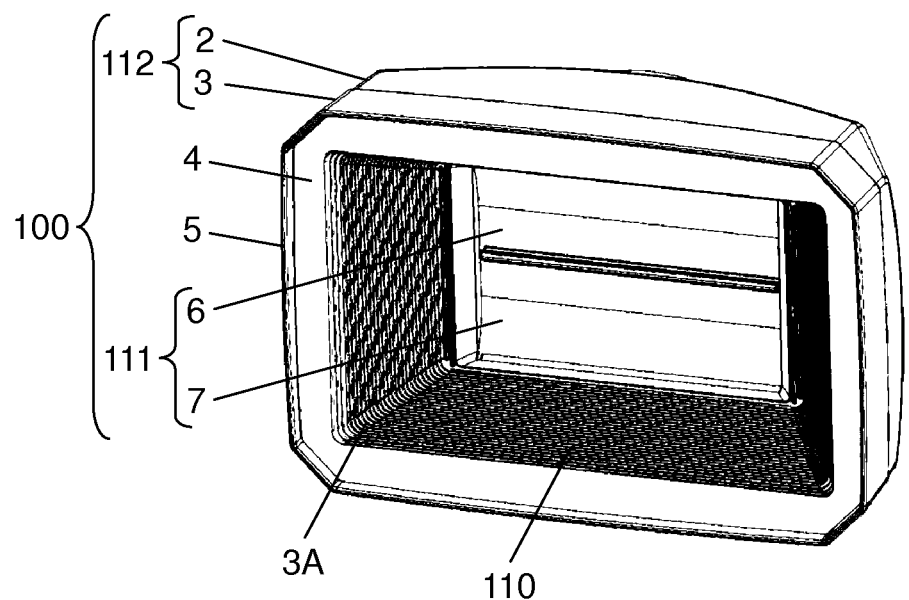
FIG. 2A is a perspective view of the lens hood in the first exemplary embodiment when viewed from the forward upper left.
Figure 2B:
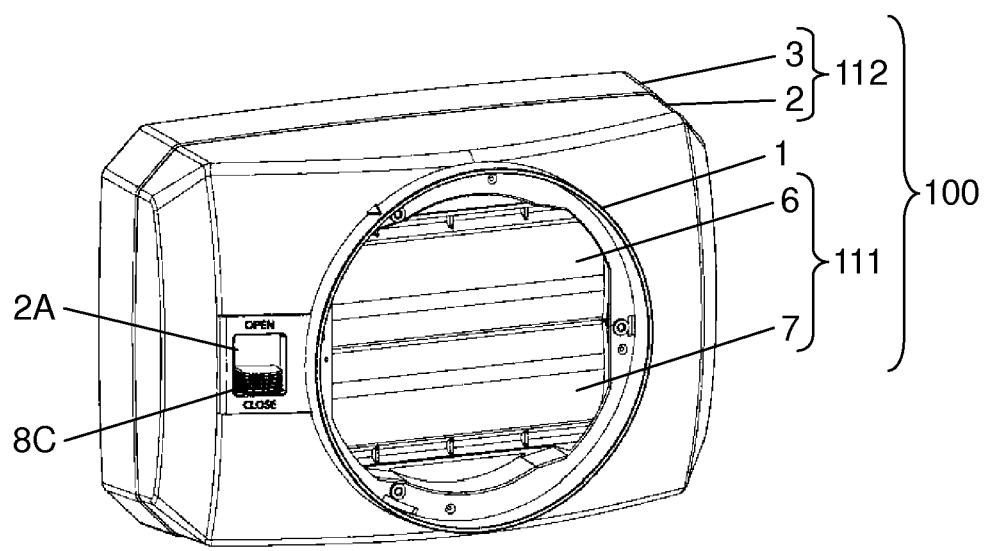
FIG. 2B is a perspective view of the lens hood in the first exemplary embodiment when viewed from the rearward upper left.

FIG. 2A is a perspective view of lens hood 100 in first exemplary embodiment when viewed from the forward upper left. FIG. 2B is a perspective view of lens hood 100 in first exemplary embodiment when viewed from the rearward upper left.

Figure 3:
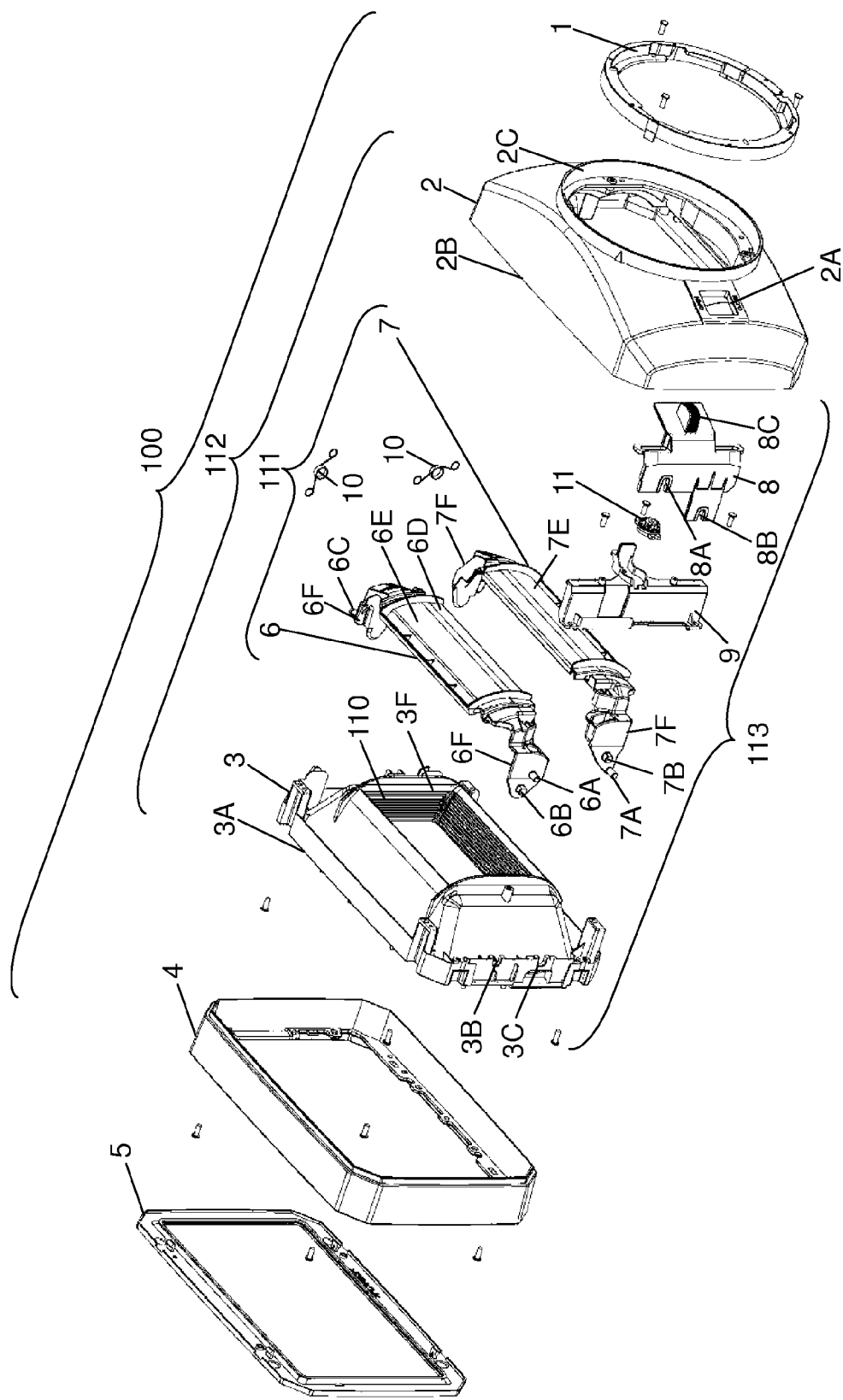
FIG. 3 is an exploded view of the lens hood in the first exemplary embodiment.

FIG. 3 is an exploded view of lens hood 100 in the first exemplary embodiment. FIG. 3 is an exploded perspective view showing exploded lens hood 100 in FIGS. 2A and 2B and each component of lens hood 100 when viewed from the rearward upper left.

Figure 4:
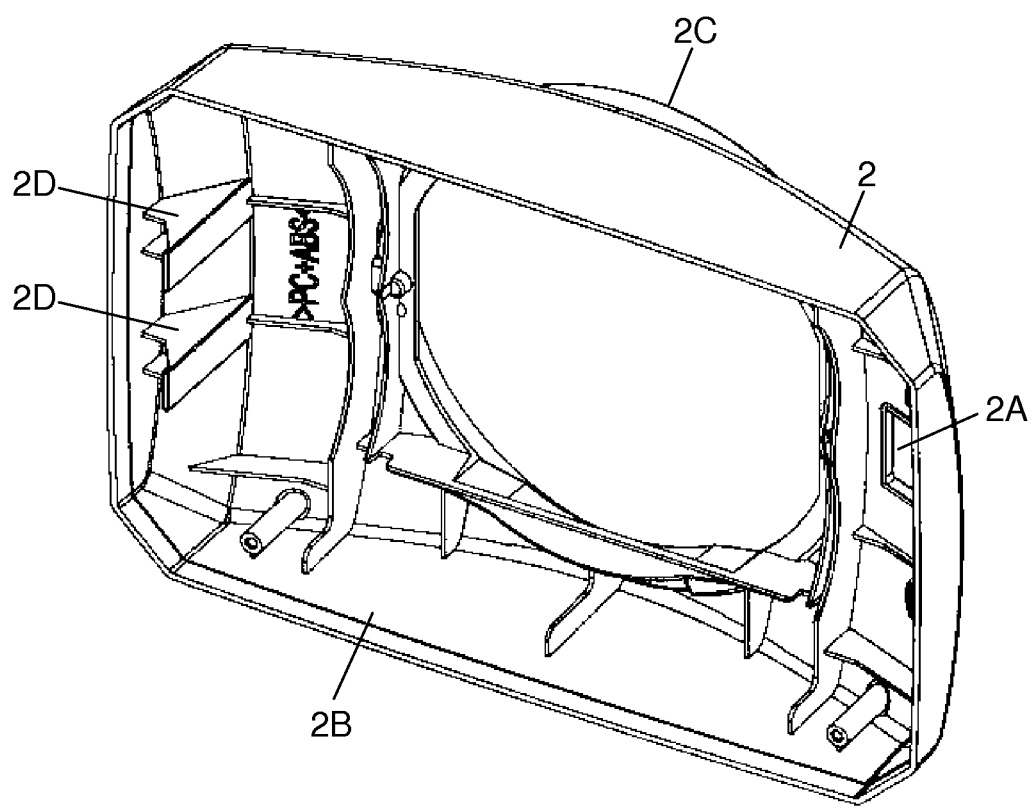
FIG. 4 is a perspective view of the hood in the first exemplary embodiment when viewed from the forward upper left.

FIG. 4 is a perspective view of hood 2 in the first exemplary embodiment when viewed from the forward upper left. The perspective view of FIG. 4 shows an internal structure of hood 2.

FIG. 5A is a front view showing lens hood 100 in the state where lens cover 111 is closed in the first exemplary embodiment. FIG. 5B is a sectional view taken along an A-A line in FIG. 5A. The front view of FIG. 5A and the sectional view of FIG. 5B show arrangement of upper door 6 and lower door 7 in the state where each of upper door 6 and lower door 7 is moved from storage space 12 and is disposed between opening 3F and a front lens element of imaging lens 202 to cover the front of imaging lens 202, thereby allowing lens cover 111 to optically and physically shield the front of imaging lens 202.

Figure 6B:
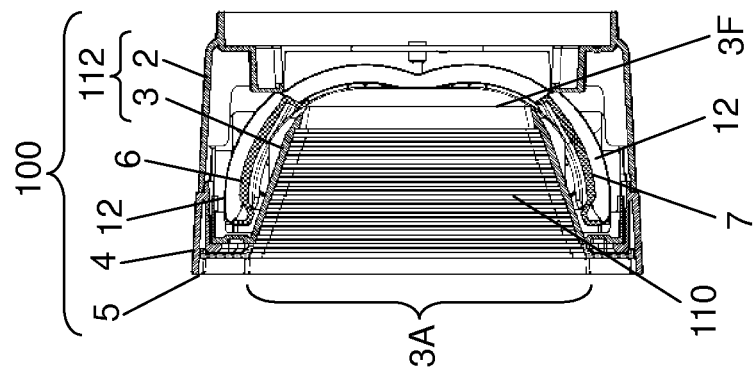
FIG. 6B is a sectional view taken along an A-A line in FIG. 6A.
Figure 6A:
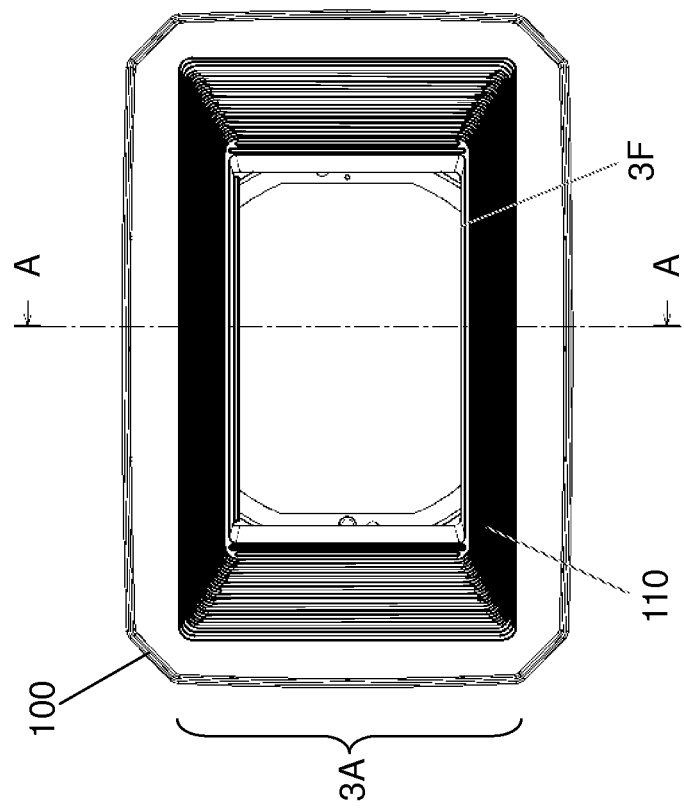
FIG. 6A is a front view of the lens hood in the state where the lens cover is opened in the first exemplary embodiment.

FIG. 6A is a front view showing lens hood 100 in the state where lens cover 111 is opened in the first exemplary embodiment. FIG. 6B is a sectional view taken along an A-A line in FIG. 6A. The front view of FIG. 6A and the sectional view of FIG. 6B show arrangement of upper door 6 and lower door 7 in the state where each of upper door 6 and lower door 7 is stored in storage space 12 to open the front of imaging lens 202 from lens cover 111.

As shown in FIGS. 2A and 2B, and FIG. 3, lens hood 100 includes hood body 112 having hood 2 and hood base 3, and lens cover 111 having a pair of upper door 6 and lower door 7. As shown in FIG. 3, lens hood 100 includes cover open/close mechanism 113. As shown in FIG. 1A to 1C, lens hood 100 is attached in front of imaging lens 202, and is configured to prevent undesired light incident on imaging lens 202 during image-taking.

Although hood body 112, lens cover 111, and cover open/close mechanism 113 have an overlapping member as shown in FIG. 3, for convenience, reference numerals are assigned in this manner in this exemplary embodiment.

Hood body 112 is configured by combining hood 2 with hood base 3. As shown in FIG. 5B and FIG. 6B, hood body 112 has storage space 12 that stores upper door 6 and lower door 7.

Lens cover 111 is configured to be able to be opened and closed. Specifically, upper door 6 and lower door 7 forming a pair are attached to hood base 3 so as to rotate in opposite directions to each other about an axis orthogonal to an optical axis of imaging lens 202 to constitute lens cover 111.

Cover open/close mechanism 113 functions to move upper door 6 and lower door 7, which are configured to rotate in opposite directions to each other, from an opened position to a closed position, or the closed position to the opened position. Hereinafter, the user's operation of moving the doors is also referred to as "opening/closing operation". The "closed position" as shown in FIGS. 5A and 5B refers to the arrangement of upper door 6 and lower door 7 in the state where upper door 6 and lower door 7 shield the front of imaging lens 202. The "opened position" as shown in FIGS. 6A and 6B refers to the arrangement of upper door 6 and lower door 7 in the state where upper door 6 and lower door 7 are stored in storage space 12. Details of the opening/closing operation will be described later.

Cover open/close mechanism 113 of lens hood 100 enables movement of upper door 6 and lower door 7 between the opened position and the closed position, that is, can open and close the doors.

When lens cover 111 is located at the closed position, as shown in FIGS. 5A and 5B, upper door 6 and lower door 7 shield an opening rearward of lens hood 100. As a result, in imaging apparatus 200 to which lens hood 100 is attached, the front of imaging lens 202 is covered with lens cover 111 such that a front lens element (foremost lens) of imaging lens 202 is optically and physically shielded with lens cover 111. That is, outside light emitted through opening 3A of lens hood 100 is shielded with lens cover 111, and sands and dusts are also shielded with lens cover 111. Therefore, since emission of outside light into imaging lens 202 and adhesion of sands and dusts to the front lens element can be prevented, imaging apparatus 200 can be carried and kept while protecting imaging lens 202 against sands and dusts, outside light.

When lens cover 111 is located at the opened position, as shown in FIG. 6B, upper door 6 and lower door 7 are stored in storage space 12. Accordingly, as shown in FIG. 6A, lens cover 111 is invisible from the front of lens hood 100, and outside light emitted through opening 3A of lens hood 100 passes rearward of lens hood 100 without being shielded with lens cover 111. That is, in imaging apparatus 200 to which lens hood 100 is attached, lens cover 111 is opened, thereby optically and physically opening the front of imaging lens 202 to bring outside light into imaging lens 202 and allow imaging apparatus 200 to prepare image-taking.

Hereinafter, movement of upper door 6 and lower door 7 from the closed position to the opened position is also referred to "open the doors", and movement of upper door 6 and lower door 7 from the opened position to the closed position is also referred to "close the doors".

Cover open/close mechanism 113 is configured to include hood base 3, upper door 6, lower door 7, rack 8, rack guide 9, pair of toggle springs 10, and torque damper 11. By using cover open/close mechanism 113 provided in lens hood 100, the user can slide operational part 8C of rack 8, which is slidably attached to hood base 3, and upper door 6 and lower door 7 can be rotated in opposite directions to each other by the sliding operation. That is, by the sliding operation of operational part 8C, the user can move upper door 6 and lower door 7 between the opened position and the closed position, and can perform the opening and closing operation of lens cover 111. Details of the mechanism will be described later.

Hood base 3 includes rectangular opening 3A in its front portion and rectangular smaller opening 3F than opening 3A in its rear portion. Opening 3A is connected to opening 3F through inner wall 110, and inner wall 110 is gradually extended from opening 3F toward opening 3A while keeping its rectangular shape.

A surface of inner wall 110 is formed to have a dustproof effect. In this exemplary embodiment, to obtain the dustproof effect, the surface of inner wall 110 is formed of stepped pattern from opening 3F toward opening 3A. Such steps prevent sands and dusts adhered to the surface of inner wall 110 from moving from opening 3A toward opening 3F, that is, from opening 3A toward imaging lens 202. Therefore, inner wall 110 in this exemplary embodiment has a higher dustproof effect than a smooth inner wall having no step.

Hood rubber 4 is attached to a front face of hood base 3, and hood rubber 4 is formed by molding a buffer material into a rectangle shape corresponding to opening 3A mainly to absorb shock. Front panel 5 is attached to a front face of hood rubber 4. Hood rubber 4 is made of an elastic material having a high shock-absorbing effect, for example, elastomer, but may be other elastic materials.

A mechanism for supporting upper door 6 and lower door 7 in hood base 3 will be described later.

As shown in FIG. 4, hood 2 has rectangular opening 2B corresponding to opening 3A of hood base 3 for attachment of hood 2 to hood base 3, circular opening 2C for attachment of hood 2 to imaging lens 202, slide hole 2A for protruding operational part 8C of rack 8 stored in hood 2 to the outside, and a pair of inner walls 2D. Slide hole 2A is dimensioned such that operational part 8C can be protruded from slide hole 2A and slid by the user. Hood 2 is shaped like a substantially rectangular box so as to ensure a space for storing upper door 6 and lower door 7 when hood 2 is attached to hood base 3, that is, to ensure a space shown as storage space 12 in FIG. 5B. Thereby, hood 2 can be attached to hood base 3 so as to cover hood base 3 from the rear of hood base 3 while forming storage space 12 between hood base 3 and hood 2. Inner walls 2D will be described later.

As shown in FIG. 3, bayonet 1 for enabling attachment/detachment to/from imaging lens 202 is attached to opening 2C of hood 2.

Bayonet 1 is formed to conform to the shape of imaging lens 202. Bayonet 1 has claws for coupling to imaging lens 202 at three positions on its circumference, and can rotate with respect to imaging lens 202, thereby being attached to and detached from imaging lens 202. Bayonet 1 is made of an elastic material such as elastomer, and elastically engages with bayonet (not shown) of imaging lens 202.

As shown in FIG. 3, upper door 6 includes shield 6E and a pair of bottom ends 6F provided on both ends of shield 6E. Boss-like upper-door rotational shafts 6B protruding orthogonal to an optical axis of imaging lens 202 are formed at respective bottom ends 6F, and upper door 6 rotates about a line connecting the pair of upper-door rotational shafts 6B to each other as a rotational shaft. Boss-like upper-door driving cam pin 6A protruding like upper-door rotational shaft 6B in the vicinity of upper-door rotational shaft 6B is formed at one bottom ends 6F (on the side where rack 8 is attached). Boss 6C protruding like upper-door rotational shaft 6B in the vicinity of upper-door rotational shaft 6B is formed at the other bottom end 6F.

As shown in FIGS. 5A and 5B, shield 6E is dimensioned to shield an upper half of opening 3F of hood base 3, and is shaped like an arc to be concave with respect to the rotational shaft. Accordingly, when upper door 6 is located at the closed position, an upper half of opening 3F of hood base 3 is shielded with upper door 6. This also shields an upper half of opening 2B of hood 2 and in turn, optically and physically shields an upper half of the front lens element of imaging lens 202. When upper door 6 is located at the opened position, as shown in FIGS. 6A and 6B, the upper half of opening 3F of hood base 3 is opened to open the upper half of opening 2B of hood 2. This causes outside light emitted through opening 3A of hood base 3 to be incident on the front lens element of imaging lens 202.

A front end of shield 6E is provided with stepped overlap part 6D that overlaps a front end of shield 7E of lower door 7 located at the closed position when upper door 6 is located at the closed position. This serves to improve the shielding effect of lens cover 111 when the doors of lens cover 111 are closed, thereby preventing light and dusts from leaking rearward from the contact place between shield 6E of upper door 6 and shield 7E of lower door 7.

As shown in FIG. 3, lower door 7 includes shield 7E and a pair of bottom ends 7F provided at both ends of shield 7E. Boss-like lower-door rotational shafts 7B protruding orthogonal to the optical axis of imaging lens 202 are formed at respective bottom ends 7F, and lower door 7 rotates about a line connecting pair of lower-door rotational shafts 7B to each other as a rotational shaft. Boss-like lower-door driving cam pin 7A protruding like lower-door rotational shaft 7B in the vicinity of lower-door rotational shaft 7B is formed at one bottom end 7F (on the side where rack 8 is attached). A boss (not shown in FIG. 3) protruding like lower-door rotational shaft 7B in the vicinity of lower-door rotational shaft 7B is formed at the other bottom end 7F. This boss is shown as boss 7C in FIG. 10.

As shown in FIGS. 5A and 5B, shield 7E is dimensioned to shield a lower half of opening 3F of hood base 3, and is shaped like an arc to be concave with respect to the rotational shaft. Accordingly, when lower door 7 is located at the closed position, the lower half of opening 3F of hood base 3 is shielded with lower door 7. This shields a lower half of opening 2B of hood 2, thereby optically and physically shielding a lower half of the front lens element of imaging lens 202. When lower door 7 is located at the opened position, as shown in FIGS. 6A and 6B, the lower half of opening 3F of the hood base 3 is opened to open the lower half of the opening 2B of hood 2. This causes outside light emitted through opening 3A of hood base 3 to be incident on the front lens element of imaging lens 202.

Desirably, upper door 6 and lower door 7 are made of a material that can shield at least visible light, has a sufficient strength against external shock, and is easily molded. Examples of the material include a black-colored synthetic resin, and metal such as aluminum.

As shown in FIG. 3, hood base 3 includes a pair of shaft grooves 3B rotatably supporting pair of upper-door rotational shafts 6B and pair of shaft grooves 3C rotatably supporting pair of lower-door rotational shafts 7B on right and left side faces (both longitudinal side faces). Pair of shaft grooves 3B engage with pair of upper-door rotational shafts 6B with each other, thereby supporting upper door 6 so as to be rotatable orthogonal to the optical axis of imaging lens 202. Similarly, pair of shaft grooves 3C engage with pair of lower-door rotational shafts 7B with each other, thereby supporting lower door 7 so as to be rotatable orthogonal to the optical axis of imaging lens part 202.

Hood base 3 has protrusions 3D and 3E (not shown in FIG. 3) for supporting toggle springs 10 on an opposite side face to the side where rack 8 is attached (hidden side face in FIG. 3). Protrusions 3D and 3E will be described later with reference to FIG. 10.

When hood base 3 is integrated with hood 2, back faces of upper-door rotational shafts 6B engaged with shaft grooves 3B and back faces of lower-door rotational shafts 7B engaged with shaft grooves 3C are supported by rack guide 9 and pair of inner walls 2D provided on hood 2 in FIG. 4. Therefore, upper-door rotational shafts 6B of upper door 6 and lower-door rotational shafts 7B of lower door 7 can be stably rotated.

Cover open/close mechanism 113 is configured to include rack 8, rack guide 9, torque damper 11, and pair of toggle springs 10 in hood body 112 formed by integrating hood base 3 with hood 2.

Rack guide 9 functions to move rack 8 in parallel when the user slides operational part 8C. Pair of toggle springs 10 functions to generate a force to bias each of upper door 6 and lower door 7 in the rotational direction. Torque damper 11 includes a gear having a resistance force to rotational motion (hereinafter referred to as "rotational resistance"). This gear is shown as gear 11A in FIG. 7.

Figure 7:
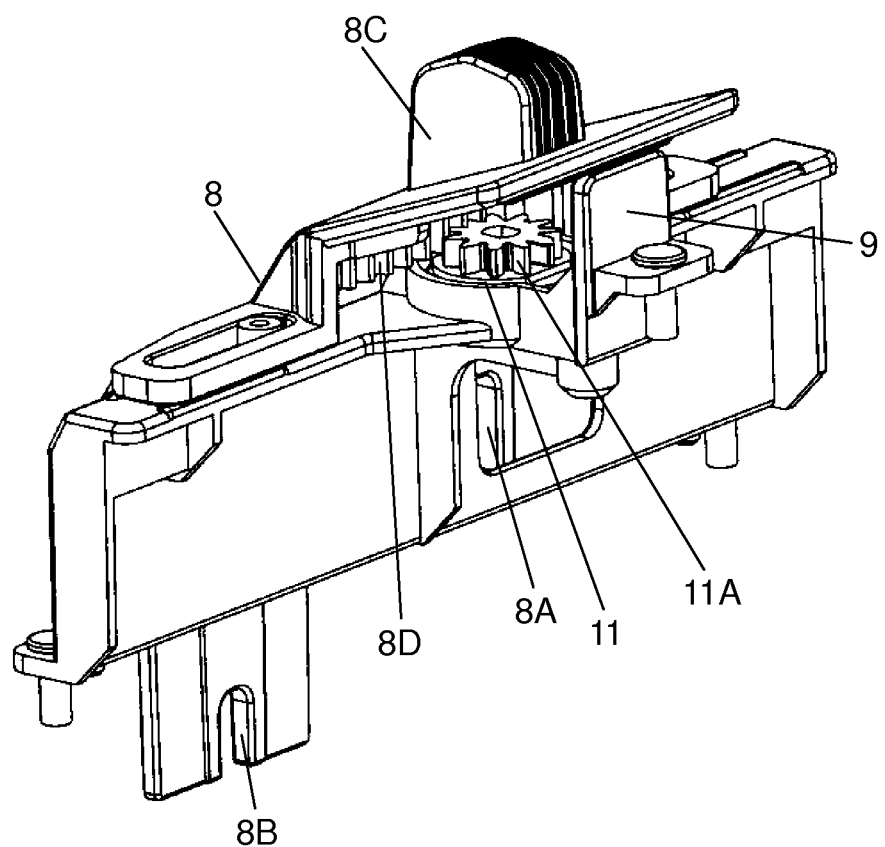
FIG. 7 is a perspective view of a rack in the first exemplary embodiment.

The functioning of torque damper 11 at the time when the user slides rack 8 will be described with reference to FIG. 7. FIG. 7 is a perspective view of rack 8 in the first exemplary embodiment.

Rack 8 includes upper-door driving cam groove 8A, lower-door driving cam groove 8B, operational part 8C, and rack gear 8D.

Operational part 8C functions to help the user to perform the sliding operation in the opening/closing operation of lens cover 111, has a protruded shape, and is dimensioned so as to be easily slid with a finger of the user, and appropriately protrude from slide hole 2A. A surface of operational part 8C is slip-proof to prevent the user's finger from slipping thereon in the sliding operation.

As shown in FIG. 7, rack gear 8D is formed in the vicinity of operational part 8C in rack 8. Torque damper 11 includes gear 11A that has a rotational resistance and engages with rack gear 8D. Torque damper 11 is attached to rack 8 such that rack gear 8D engages with gear 11A. Accordingly, the rotational resistance of gear 11A of torque damper 11 is transmitted to rack 8 through rack gear 8D. Thus, rack 8 has a resistance force to parallel movement, and it can be prevented that rack 8 moves in parallel too rapidly when the user slides operational part 8C. In addition, for example, it can be prevented that upper door 6 hits against lower door 7 with too much momentum when the user open/close lens cover 111, thereby generating a large crash sound.

Next, the opening/closing operation of lens cover 111 of lens hood 100 thus configured will be described.

[1-2. Opening/Closing Operation of Lens Cover]

A mechanism for converting parallel movement of rack 8 into rotation of upper door 6 and lower door 7 will be described with reference to FIG. 8A to FIG. 9D. FIG. 8A to FIG. 9D are views illustrating the operation of each mechanism in opening/closing of lens cover 111. For convenience, the operational direction of each member is represented by a thick arrow in FIG. 8A to FIG. 9D.

Figure 8A:
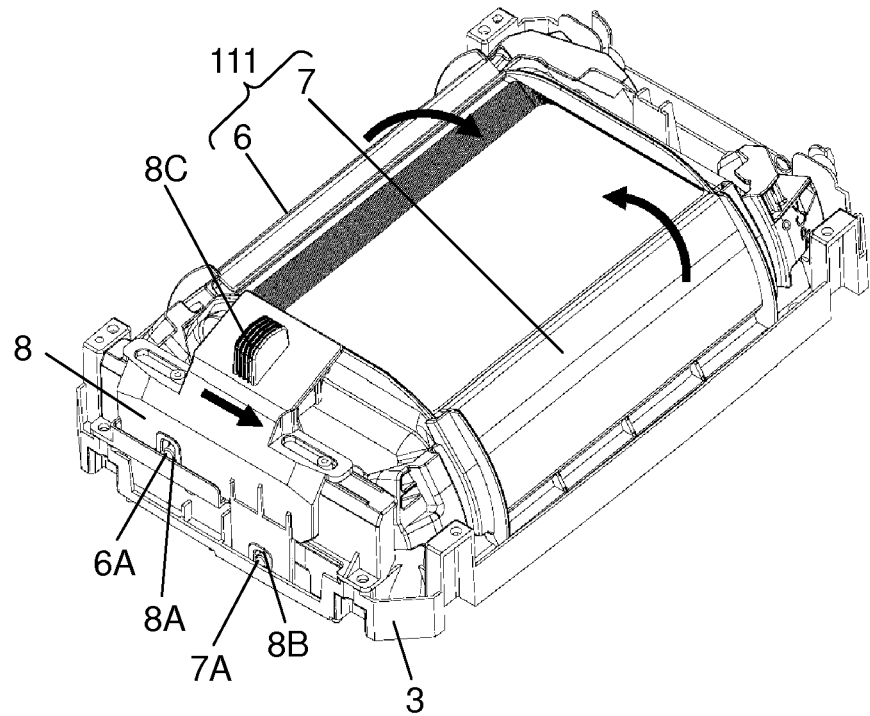
FIG. 8A is a perspective view showing the state where the lens cover attached to a hood base is opened in the first exemplary embodiment.
Figure 8B:
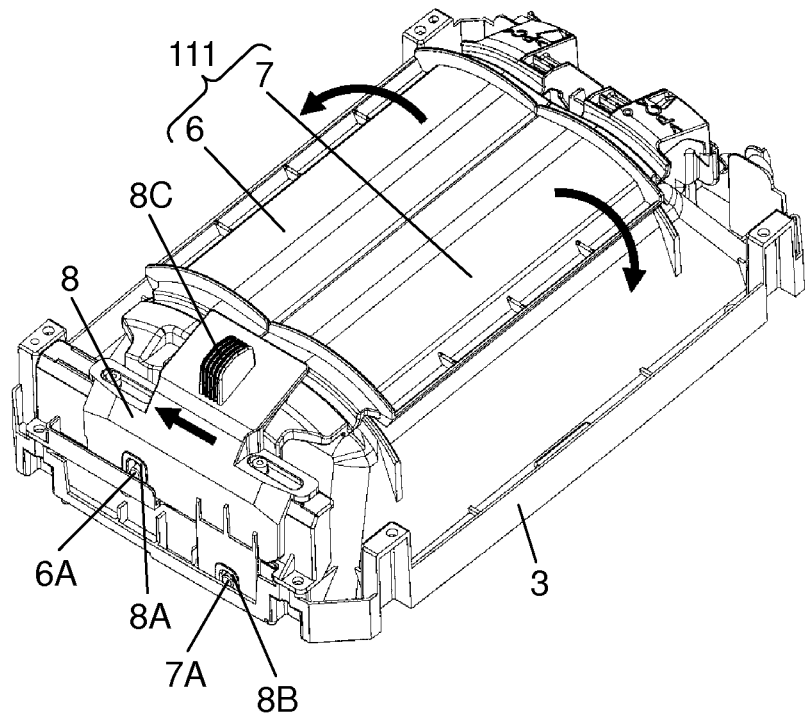
FIG. 8B is a perspective view showing the state where the lens cover attached to the hood base is closed in the first exemplary embodiment.

FIG. 8A is a perspective view showing the state where lens cover 111 attached to hood base 3 is opened in the first exemplary embodiment. FIG. 8B is a perspective view showing the state where lens cover 111 attached to hood base 3 is closed in the first exemplary embodiment.

Figure 9A:
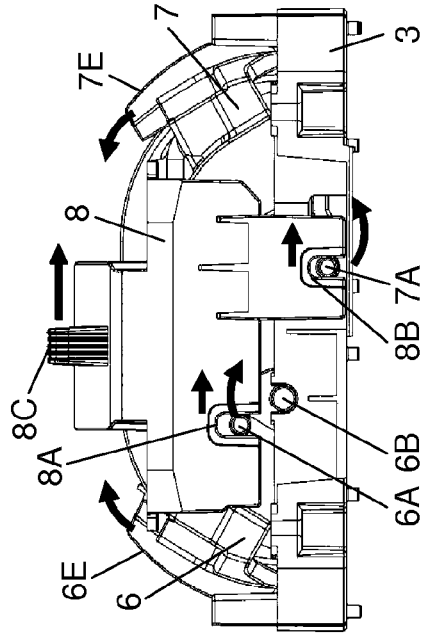
FIG. 9A is a side view showing the state where the lens cover attached to the hood base is opened in the first exemplary embodiment.
Figure 9C:
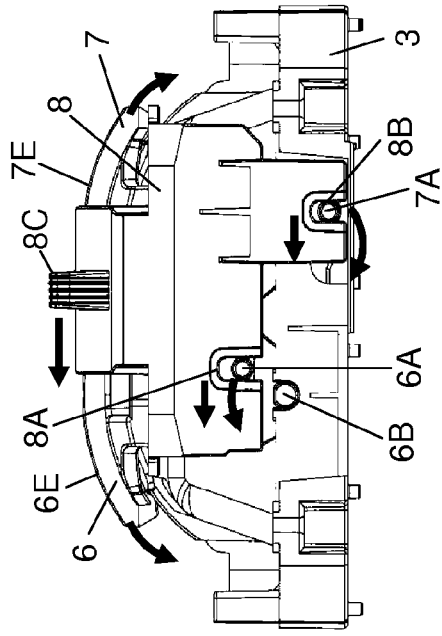
FIG. 9C is a side view showing the state where the lens cover attached to the hood base is opened by a rack sliding operation.
Figure 9B:
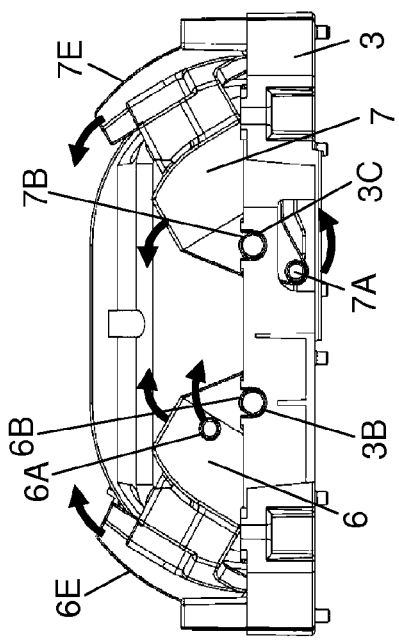
FIG. 9B is a side view showing the state where the lens cover attached to the hood base is closed in the first exemplary embodiment.
Figure 9D:
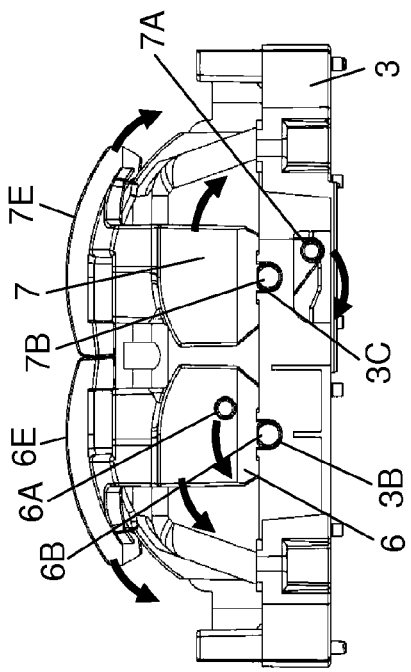
FIG. 9D is a side view showing the state where the lens cover attached to the hood base is closed by a rack sliding operation.

FIG. 9A is a side view showing the state where lens cover 111 attached to hood base 3 is opened in the first exemplary embodiment. FIG. 9B a side view showing the state where lens cover 111 attached to hood base 3 is closed in the first exemplary embodiment. FIG. 9C is a side view showing the state where lens cover 111 attached to hood base 3 is opened by a sliding operation of rack 8 in the first exemplary embodiment. FIG. 9D is a side view showing the state where lens cover 111 attached to hood base 3 is closed by a sliding operation of rack 8 in the first exemplary embodiment.

FIGS. 9A and 9B illustrate the operation of each member without showing rack 8, and FIGS. 9C and 9D show rack 8 and the operation of each member. In FIG. 9A to 9D, a left side corresponds to an upper side of lens hood 100, and a right side corresponds to a lower side of lens hood 100.

As shown in FIGS. 9A and 9B, in lens hood 100, pair of upper-door rotational shafts 6B provided on upper door 6 is axially supported by pair of shaft grooves 3B provided in hood base 3. Similarly, pair of lower-door rotational shafts 7B provided on lower door 7 is axially supported by pair of shaft grooves 3C provided in hood base 3. Although FIGS. 9A and 9B show only one side face of hood base 3, as shown in below-mentioned FIG. 10, the combination of shaft grooves 3B and upper-door rotational shafts 6B, and the combination of shaft grooves 3C and lower-door rotational shafts 7B are provided on the other side face of hood base 3.

Upper door 6 rotates about pair of upper-door rotational shafts 6B axially supported by pair of shaft grooves 3B, as rotational shafts, and lower door 7 rotates about pair of lower-door rotational shafts 7B axially supported by pair of shaft grooves 3C, as rotational shafts.

In upper door 6, upper-door driving cam pin 6A is provided in the vicinity of upper-door rotational shafts 6B between shield 6E and upper-door rotational shafts 6B. Thus, shield 6E and upper-door driving cam pin 6A move in the same direction. For example, as shown in FIG. 9A, by moving upper-door driving cam pin 6A to the right in FIG. 9A, upper door 6 rotates about upper-door rotational shafts 6B as rotational shafts to the right in FIG. 9A, and shield 6E moves from the opened position to the closed position. As shown in FIG. 9B, by moving upper-door driving cam pin 6A to the left in FIG. 9B, upper door 6 rotates about upper-door rotational shafts 6B as rotational shafts to the left in FIG. 9B, and shield 6E moves from the closed position to the opened position.

In lower door 7, lower-door driving cam pin 7A is provided in the vicinity of lower-door rotational shafts 7B such that lower-door rotational shafts 7B is disposed between shield 7E and lower-door driving cam pin 7A. Thus, shield 7E and lower-door driving cam pin 7A move in opposite directions to each other. For example, as shown in FIG. 9A, by moving lower-door driving cam pin 7A to the right in FIG. 9A, lower door 7 rotates about lower-door rotational shafts 7B as rotational shafts to the left in FIG. 9A, and shield 7E moves from the opened position to the closed position. As shown in FIG. 9B, by moving lower-door driving cam pin 7A to the left in FIG. 9B, lower door 7 rotates about lower-door rotational shafts 7B as rotational shafts to the right in FIG. 9B, and shield 7E moves from the closed position to the opened position.

As shown in FIGS. 9C and 9D, rack 8 is attached to hood base 3, upper door 6, and lower door 7 such that upper-door driving cam groove 8A of rack 8 engages with upper-door driving cam pin 6A of upper door 6, and lower-door driving cam groove 8B of rack 8 engages with lower-door driving cam pin 7A of lower door 7. Accordingly, as shown in FIG. 9C, when rack 8 moves in parallel to the right in FIG. 9C, upper-door driving cam pin 6A receives a rightward force from upper-door driving cam groove 8A in FIG. 9C to move to the right. Similarly, lower-door driving cam pin 7A receives a rightward force from lower-door driving cam groove 8B in FIG. 9C to move to the right. Thereby, upper door 6 and lower door 7 rotate in opposite directions to each other, and move from the opened position to the closed position. As shown in FIG. 9D, when rack 8 moves to the left in FIG. 9D, upper-door driving cam pin 6A receives a leftward force from upper-door driving cam groove 8A in FIG. 9D to move to the left. Similarly, lower-door driving cam pin 7A receives a leftward force from lower-door driving cam groove 8B in FIG. 9D to move to the left. Thereby, upper door 6 and lower door 7 rotate in opposite directions to each other, and move from the closed position to the opened position.

As described above, in lens hood 100 in this exemplary embodiment, relative positional relation between upper-door rotational shafts 6B and upper-door driving cam pin 6A is opposite to relative positional relation between lower-door rotational shafts 7B and lower-door driving cam pin 7A. For this reason, when the user slides operational part 8C to move rack 8 in parallel, upper door 6 and lower door 7 rotate in opposite directions to each other. That is, the user can open and close lens cover 111 by sliding operational part 8C.

The opening/closing operation of upper door 6 and lower door 7 is biased by toggle springs 10. This configuration will be described with reference to FIG. 10.

Figure 10:
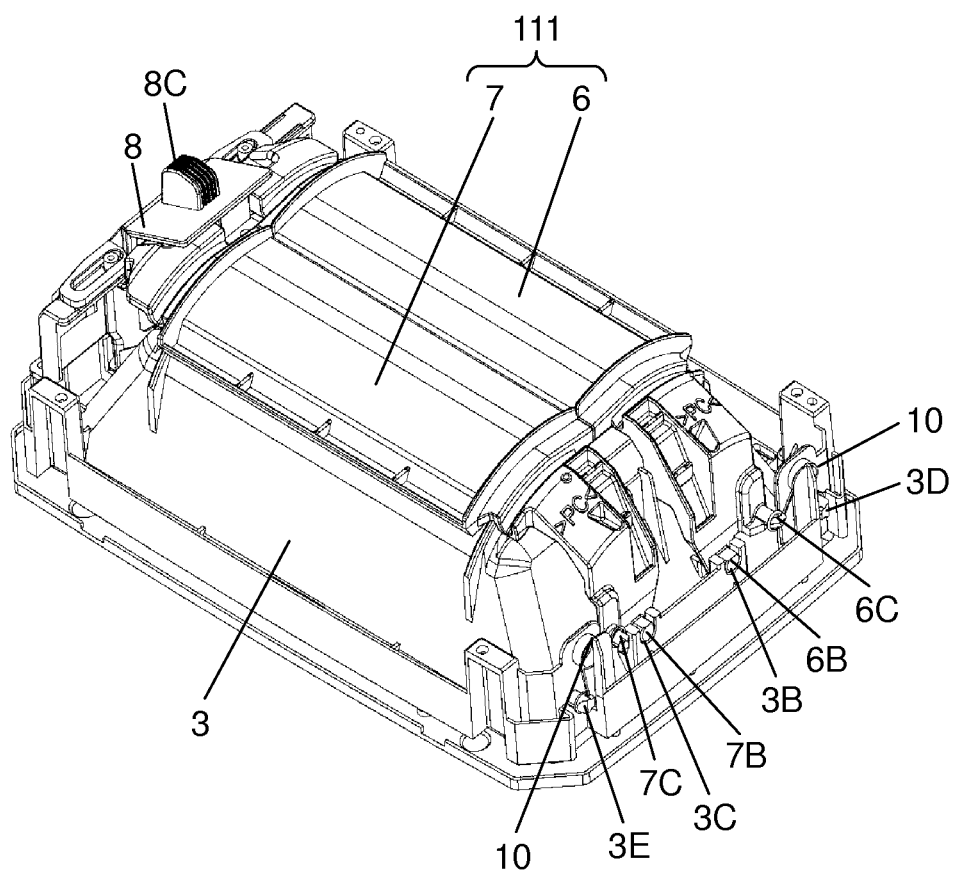
FIG. 10 is a perspective view showing the state where the lens cover attached to the hood base is closed in the first exemplary embodiment.

FIG. 10 is a perspective view showing the state where lens cover 111 attached to hood base 3 is closed in the first exemplary embodiment. The perspective view of FIG. 10 shows locations of toggle springs 10 that bias lens cover 111 when lens cover 111 attached to hood base 3 is opened or closed.

As shown in FIG. 10, lens hood 100 has pair of toggle springs 10. One toggle spring 10 is a component to bias upper door 6, and engages with protrusion 3D of hood base 3 and boss 6C of upper door 6. The other toggle springs 10 is a component to bias lower door 7, and engages protrusion 3E of hood base 3 and boss 7C of lower door 7.

Lens hood 100 in this exemplary embodiment includes a toggle mechanism which is configured to include pair of toggle springs 10, protrusions 3D and 3E provided on hood base 3, boss 6C of upper door 6, and boss 7C of lower door 7.

In both cases where upper door 6 and lower door 7 are moved from the opened position to the closed position and upper door 6 and lower door 7 are moved from the closed position to the opened position, toggle springs 10 generate a resistance force to the movement at start of movement in upper door 6 and lower door 7, and then, bias upper door 6 and lower door 7 in the moving direction when upper door 6 and lower door 7 pass a predetermined position (for example, a middle point between the closed position and the opened position). Therefore, upper door 6 and lower door 7 are stably disposed at the closed position or the opened position.

[1-3. Effect]

As described above, in this exemplary embodiment, lens hood 100 is attached in front of imaging lens 202 and is configured to prevent undesired light incident on imaging lens 202. Lens hood 100 includes lens cover 111 having upper door 6 and lower door 7 and hood body 112. Hood body 112 supports upper door 6 and lower door 7 so as to rotate upper door 6 and lower door 7 in opposite directions to each other about the axis orthogonal to the optical axis of imaging lens 202, and has storage space 12 that stores upper door 6 and lower door 7.

In lens hood 100, while lens cover 111 is closed, upper door 6 and lower door 7 can shield the front of imaging lens 202. That is, lens hood 100 has a function as the lens hood (function of preventing undesired light incident on imaging lens 202) as well as a function as the lens cap (function of optically and physically shielding the front face of imaging lens 202).

In this exemplary embodiment, imaging apparatus 200 includes imaging main body 201, imaging lens 202 attached to imaging main body 201, and lens hood 100 attached in front of imaging lens 202.

Accordingly, by attaching lens hood 100 to imaging apparatus 200, the necessity of exchanging lens hood with lens cap at image-taking and carrying can be eliminated, improving the convenience for the user.

In this exemplary embodiment, hood body 112 includes hood base 3 that rotatably supports upper door 6 and lower door 7, and hood 2 attached to hood base 3 to cover hood base 3 forming storage space 12 between hood 2 and hood base 3.

In this exemplary embodiment, upper door 6 and lower door 7 are supported by hood base 3 so as to rotate between the opened position where the doors are stored in storage space 12 and the front of imaging lens 202 is opened and the closed position where the front of imaging lens 202 is shielded.

Thus, in lens hood 100, when lens cover 111 is opened, as shown in FIG. 6B, upper door 6 and lower door 7 can be stored in storage space 12.

For example, with a conventional structure in which an upper door and a lower door fall to the inner wall of lens hood to open the lens cover (for example, the above-mentioned structure disclosed in Patent Document 1), during opening of the lens cover, back faces of upper door and lower door (faces opposed to the front face of imaging lens during opening of the lens cover) are exposed and therefore, sands and dusts are easily adhered to the back faces of upper door and lower door. Accordingly, in the opening/closing operation of the lens cover, sands and dusts adhered to the back faces of the upper door and the lower door can move and adhere to the front face of the imaging lens. Such sands and dusts may soil and damage the surface of the lens.

However, in lens hood 100 in this exemplary embodiment, when lens cover 111 is opened, for example, as shown in FIG. 6B and FIG. 8A, upper door 6 and lower door 7 each are stored in storage space 12. That is, in either state where lens cover 111 is located at the closed position or at the opened position, when back faces of upper door 6 and lower door 7 (faces opposed to the front face of imaging lens 202 when lens cover 111 is located at the closed position) are not exposed and therefore, sands and dusts are hard to adhere to the back faces of upper door 6 and lower door 7. Therefore, in lens hood 100 in this exemplary embodiment, in the opening/closing operation of lens cover 111, sands and dusts hardly adhere to the front face of imaging lens 202, reducing the possibility that sands and dusts soil or damage the surface of imaging lens 202.

In this exemplary embodiment, upper door 6 has pair of boss-like upper-door rotational shafts 6B, and lower door 7 has pair of boss-like lower-door rotational shafts 7B. Hood base 3 has pair of shaft grooves 3B rotatably supporting pair of upper-door rotational shafts 6B and pair of shaft grooves 3C rotatably supporting pair of lower-door rotational shafts 7B.

In this exemplary embodiment, lens hood 100 includes rack 8 having upper-door driving cam groove 8A and lower-door driving cam groove 8B. Upper-door driving cam pin 6A is formed in the vicinity of upper-door rotational shaft 6B of upper door 6, and lower-door driving cam pin 7A is formed in the vicinity of lower-door rotational shaft 7B of lower door 7. Rack 8 is arranged such that upper-door driving cam pin 6A engages with upper-door driving cam groove 8A and lower-door driving cam pin 7A engages with lower-door driving cam groove 8B. In lens hood 100, through parallel movement of rack 8, upper-door driving cam pin 6A is moved by pressure of upper-door driving cam groove 8A, so that upper door 6 rotates about upper-door rotational shafts 6B, and lower-door driving cam pin 7A is moved by pressure of lower-door driving cam groove 8B, so that lower door 7 rotates about lower-door rotational shafts 7B.

In lens hood 100 in this exemplary embodiment, relative positional relation between upper-door rotational shafts 6B and upper-door driving cam pin 6A is opposite to relative positional relation between lower-door rotational shafts 7B and lower-door driving cam pin 7A, enabling upper door 6 and lower door 7 to rotate in opposite directions to each other.

In this exemplary embodiment, rack 8 has operational part 8C for the user to perform the sliding operation.

Thereby, the user can rotate upper door 6 and lower door 7 in opposite directions to each other, by the sliding operation of operational part 8C. That is, the user can perform the opening and closing operation of lens cover 111 easily, by the sliding operation of operational part 8C.

In this exemplary embodiment, hood base 3 has inner wall 110 shaped to have the dustproof effect. When located at both the opened position and closed position, upper door 6 and lower door 7 do not cover inner wall 110, resulting in that inner wall 110 of hood base 3 is exposed at all times.

Thus, in lens hood 100, irrespective of opening or closing of lens cover 111, the dustproof effect of the surface of inner wall 110 can be acquired at all times.

For example, with the conventional structure in which the upper door and the lower door fall to the inner wall of lens hood to open the lens cover (for example, the above-mentioned structure disclosed in Patent Document 1), during opening of the lens cover, the upper door and the lower door cover the inner wall of the lens hood. For this reason, even when the surface of the inner wall of the lens hood has the dustproof effect, during opening of the lens cover, for example, during image-taking, the surface of the inner wall of the lens hood is covered with the upper door and the lower door, decreasing the dustproof effect.

However, in lens hood 100 in this exemplary embodiment, while the lens cover 111 is opened, for example, as shown in FIG. 6B and FIG. 8A, upper door 6 and lower door 7 each are stored in storage space 12. That is, in either state where lens cover 111 is located at the closed position or at the opened position, the surface of inner wall 110 of hood base 3 is not covered with upper door 6 and lower door 7, and remains exposed at all times. Accordingly, in lens hood 100 in this exemplary embodiment, irrespective of opening or closing of lens cover 111, the dustproof effect of the surface of inner wall 110 can be obtained at any time. That is, even while lens cover 111 is opened to use imaging apparatus 200 for image-taking, the dustproof effect of the surface of inner wall 110 can be acquired as in the same manner in which lens cover 111 is closed.

In other words, the technique of the lens hood in this exemplary embodiment is effective for improving the dustproof effect against sands and dusts.

Further, the lens hood of the present disclosure is attached in front of the imaging lens and therefore, is especially effective for an imaging apparatus in which operational ring 210 is provided around the imaging lens, making arrangement of another member around the imaging lens difficult, for example, business-grade video camera.

Other Exemplary Embodiments

The first exemplary embodiment has been described as an example of the technique disclosed in this application. However, the technique of the present disclosure is not limited to this, and may be applied to exemplary embodiments subjected modification, replacement, addition, and omission.

Further, the constituents in the first exemplary embodiment may be combined with each other to create a new exemplary embodiment.

Other exemplary embodiments will be described.

Although the surface of inner wall 110 is formed of stepped pattern in the first exemplary embodiment, the surface of inner wall 110 is not limited to this, and may take any shape having the dustproof effect. For example, the surface of inner wall 110 may be embossed with semi-granular protrusions or convex lines to have irregularities.

The present disclosure can apply to a lens hood attached in front of the imaging lens, and an imaging apparatus in which the lens hood can be attached in front of the imaging lens. Specifically, the present disclosure can apply to moving imaging apparatuses such as business-grade video cameras and consumer video cameras, and still imaging apparatuses such as digital still cameras, as well as the lens hood attached to the imaging apparatuses.

What is claimed is:

1. A lens hood to be attached in front of an imaging lens and configured to prevent undesired light incident on the imaging lens, the lens hood comprising:
   a lens cover having an upper door and a lower door; and
   a hood body configured to support the upper door and the lower door so as to rotate the upper door and the lower door in opposite directions to each other about an axis orthogonal to an optical axis of the imaging lens, wherein:
   the hood body includes a storage space configured to store the upper door and the lower door, and
   when the upper door and the lower door are stored in the storage space, front faces and back faces of the upper door and the lower door are not exposed to an opening of the lens hood, the back faces being opposed to the imaging lens when lens hood is attached to the imaging lens and the upper door and the lower door are in a closed position.

2. The lens hood according to claim 1, wherein
   the hood body includes:
   a hood base configured to rotatably support the upper door and the lower door; and
   a hood configured to cover the hood base to form the storage space between the hood and the hood base.

3. The lens hood according to claim 2, wherein:
   the upper door and the lower door are supported by the hood base so as to rotate between an opened position where the doors are stored in the storage space and a front of the imaging lens is opened and the closed position where the front of the imaging lens is shielded.

4. The lens hood according to claim 3, wherein:
   the upper door has a pair of boss-like upper-door rotational shafts,
   the lower door has a pair of boss-like lower-door rotational shafts, and
   the hood base has a pair of shaft grooves rotatably supporting the pair of upper-door rotational shafts and a pair of shaft grooves rotatably supporting the pair of lower-door rotational shafts.

5. The lens hood according to claim 4, further comprising a rack having an upper-door driving cam groove and a lower-door driving cam groove, wherein:
   an upper-door driving cam pin is formed in the vicinity of the upper-door rotational shaft of the upper door,
   a lower-door driving cam pin is formed in the vicinity of the lower-door rotational shaft of the lower door,
   the rack is disposed such that the upper-door driving cam pin engages with the upper-door driving cam groove and the lower-door driving cam pin engages with the lower-door driving cam groove, and
   through parallel movement of the rack, the upper-door driving cam pin is moved by pressure of the upper-door driving cam groove to rotate the upper door about the upper-door rotational shafts, and the lower-door driving cam pin is moved by pressure of the lower-door driving cam groove to rotate the lower door about the lower-door rotational shafts.

6. The lens hood according to claim 5, wherein
   relative positional relation between the upper-door rotational shafts and the upper-door driving cam pin is made opposite to relative positional relation between the lower-door rotational shafts and the lower-door driving cam pin, so that the upper door and the lower door can rotate in opposite directions to each other.

7. The lens hood according to claim 5, wherein
   the rack has an operational part for a user's sliding operation.

8. The lens hood according to claim 1, wherein:
   the hood base has an inner wall formed of a shape having a dustproof effect, and
   in either case where the upper door and the lower door are located at an opened position or at a closed position, the upper door and the lower door do not cover the inner wall, so that the inner wall is exposed at all times.

9. The lens hood according to claim 8, wherein
   the inner wall is formed of stepped pattern.

10. An imaging apparatus comprising:
    an imaging main body;
    an imaging lens attached to the imaging main body; and
    the lens hood according to claim 1 attached in front of the imaging lens and configured to prevent undesired light incident on the imaging lens.

11. A lens hood to be attached in front of an imaging lens and configured to prevent undesired light incident on the imaging lens, the lens hood comprising:
    a lens cover having an upper door and a lower door; and
    a hood body configured to support the upper door and the lower door so as to rotate the upper door and the lower door in opposite directions to each other about an axis orthogonal to an optical axis of the imaging lens, wherein:
    the hood body includes a storage space configured to store the upper door and the lower door,
    the hood body includes:
    a hood base configured to rotatably support the upper door and the lower door; and
    a hood configured to cover the hood base to form the storage space between the hood and the hood base,
    the upper door and the lower door are supported by the hood base so as to rotate between an opened position where the doors are stored in the storage space and a front of the imaging lens is opened and a closed position where the front of the imaging lens is shielded,
    the upper door has a pair of boss-like upper-door rotational shafts,
    the lower door has a pair of boss-like lower-door rotational shafts, and
    the hood base has a pair of shaft grooves rotatably supporting the pair of upper-door rotational shafts and a pair of shaft grooves rotatably supporting the pair of lower-door rotational shafts.

12. The lens hood according to claim 11, further comprising a rack having an upper-door driving cam groove and a lower-door driving cam groove, wherein:

an upper-door driving cam pin is formed in the vicinity of the upper-door rotational shaft of the upper door, a lower-door driving cam pin is formed in the vicinity of the lower-door rotational shaft of the lower door, the rack is disposed such that the upper-door driving cam pin engages with the upper-door driving cam groove and the lower-door driving cam pin engages with the lower-door driving cam groove, and through parallel movement of the rack, the upper-door driving cam pin is moved by pressure of the upper-door driving cam groove to rotate the upper door about the upper-door rotational shafts, and the lower-door driving cam pin is moved by pressure of the lower-door driving cam groove to rotate the lower door about the lower-door rotational shafts.

13. The lens hood according to claim 12, wherein relative positional relation between the upper-door rotational shafts and the upper-door driving cam pin is made opposite to relative positional relation between the lower-door rotational shafts and the lower-door driving cam pin, so that the upper door and the lower door can rotate in opposite directions to each other.

14. The lens hood according to claim 12, wherein the rack has an operational part for a user's sliding operation.

15. A lens hood to be attached in front of an imaging lens and configured to prevent undesired light incident on the imaging lens, the lens hood comprising:

a lens cover having an upper door and a lower door; and a hood body configured to support the upper door and the lower door so as to rotate the upper door and the lower door in opposite directions to each other about an axis orthogonal to an optical axis of the imaging lens, wherein:

the hood body includes a storage space configured to store the upper door and the lower door, the hood body includes a hood base configured to rotatably support the upper door and the lower door, the hood base has an inner wall formed of a shape having a dustproof effect, and in either case where the upper door and the lower door are located at an opened position or at a closed position, the upper door and the lower door do not cover the inner wall, so that the inner wall is exposed at all times.

16. The lens hood according to claim 15, wherein the inner wall is formed of stepped pattern.

17. An imaging apparatus comprising:

an imaging main body;

an imaging lens attached to the imaging main body; and the lens hood according to claim 11 attached in front of the imaging lens and configured to prevent undesired light incident on the imaging lens.

18. An imaging apparatus comprising:

an imaging main body;

an imaging lens attached to the imaging main body; and the lens hood according to claim 15 attached in front of the imaging lens and configured to prevent undesired light incident on the imaging lens.

* * * * *